Patented Aug. 26, 1952

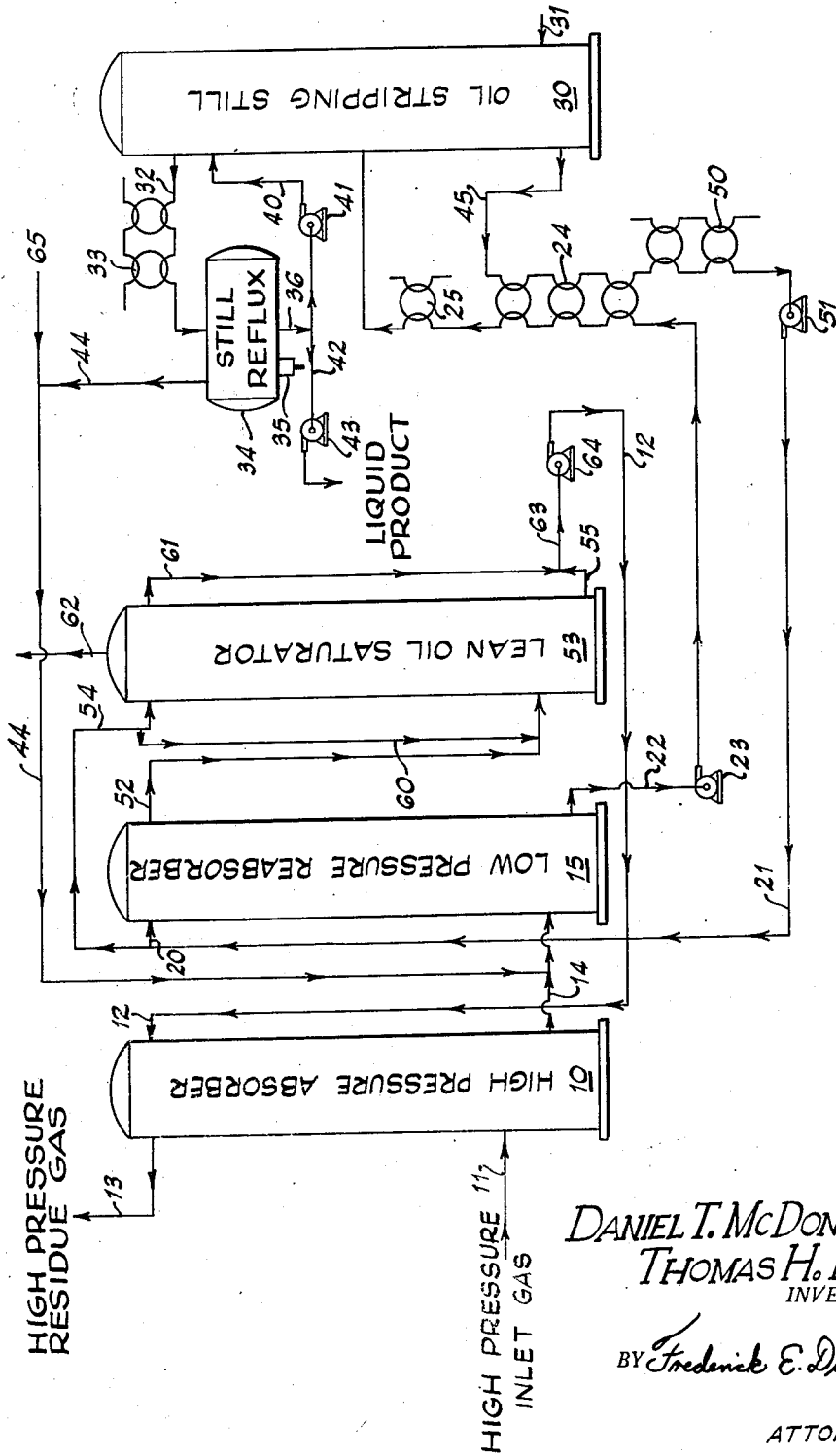

2,608,270

UNITED STATES PATENT OFFICE 2,608,270

METHOD OF SEPARATING LIGHT HYDROCARBON FROM HIGH-PRESSURE GAS

Daniel T. McDonald, Jr., and Thomas H. King, Dallas, Tex., assignors, by mesne assignments, to Socony-Vacuum Oil Company, Incorporated, New York, N. Y., a corporation of New York Application July 1, 1950, Serial No. 171,586

6 Claims. (Cl. 183—115)

This invention relates to the treatment of gases with a liquid absorbent to separate the lighter constituents from the heavier constituents and relates more particularly to the treatment with an absorption oil of high pressure gases containing hydrocarbon constituents to separate and recover the heavier hydrocarbon constituents and to separate and recover the lighter hydrocarbon constituents at high pressures.

Gas containing heavy and light constituents can be treated for the separation and recovery of the heavy constituents and the light constituents by contacting the gas with an absorption liquid or oil under proper reaction conditions of temperature, pressure, etc., whereby the heavier constituents to a predominant extent dissolve in the absorption oil. The absorption operation may be carried out to dissolve to a predominant extent in the absorption oil any of the constituents of the gas having a boiling point higher than the boiling point of the lowest boiling point constituent of the fraction desired to be separated from the other constituents of the gas. Usually, however, the absorption operation is carried out on gases containing constituents which may be maintained in the liquid phase at practicably attainable pressures and temperatures, and reaction conditions are selected to dissolve these constituents to a predominant extent in the absorption oil. Thus, the absorption operation may be carried out, for example, on a hydrocarbon-containing gas such as a refinery gas, casing-head gas, natural gas, or the like to dissolve to a predominant extent in the absorption oil the constituents boiling in the gasoline boiling range and above, the propane and higher boiling constituents, etc. The constituents of the gas not dissolving in the absorption oil are recovered in the stream of gas, termed the residue gas, leaving the absorption operation apparatus, and the constituents of the gas dissolving in the absorption oil are recovered therefrom, by distillation or other suitable procedure, as a liquid fraction, termed the raw liquid product.

Often, it is desired to recover the residue gas at high pressures, as, for example, where it is desired to utilize a hydrocarbon residue gas for pressure maintenance of a subterranean petroleum reservoir or to supply it to a high pressure gas utility system. In such cases, it is preferred to carry out the absorption operation at a pressure as close as possible to the pressure of the feed gas in order to minimize or avoid pressuring of the residue gas. However, where the absorption operation is carried out at high pressures, a larger quantity of the gas constituents having a boiling point lower than the boiling point of the fraction desired boiling point constituent to dissolve in the absorption oil dissolves in the absorption oil which reduces the quantity of residue gas obtained from the absorption operation. It has been proposed to predissolve propane or other feed gas constituent in the absorption oil for the purpose of decreasing the amount of propane or other feed gas constituent dissolving from the feed gas in the absorption oil and minimizing heat rise of the absorption oil, which procedure results in increasing the amount of high pressure residue gas, but heretofore this procedure has necessitated an undesirably large amount of equipment and additional heating and cooling operations which offset, from an economic standpoint, to a large extent the increase in the amount of high pressure residue gas obtained.

It is an object of this invention to provide a method of treating a high pressure gas to separate heavier constituents from lighter constituents. It is another object of this invention to provide a method of obtaining large quantities of high pressure residue gas. It is another object of this invention to reduce the amount of equipment and the number of heating and cooling operations required for the absorption treatment of high pressure gas to obtain large quantities of high pressure residue gas. It is another object of this invention to provide a method of presaturating absorption oil with residue gas constituents. These and further objects of this invention will become apparent from the following description thereof.

In accordance with this invention, a high pressure feed gas is passed to a first absorber operated at a high pressure, the rich absorption oil from the first absorber is passed to a reabsorber operated at a lower pressure wherein gases contained in the rich absorption oil are flashed therefrom and contacted with lean absorption oil, the unabsorbed gases from the reabsorber are passed to a lean oil saturator and contacted with lean absorption oil, the rich oil from the reabsorber is stripped and low pressure gas, raw liquid product, and lean absorption oil are recovered therefrom as separate streams, the low pressure gas stripped from the rich oil is recycled to the reabsorber, low pressure by-product gas is removed from the lean oil saturator, the oil from the lean oil saturator is pumped to the high pressure absorber and contacted therein with the high pressure feed gas, and high pressure residue gas is recovered from the high pressure absorber.

Reference will now be made for a more detailed description of the invention to the accompanying figure which is a flowsheet schematically illustrating one embodiment of the invention. In the flowsheet, for purposes of simplification of description, the invention is schematically illustrated in connection with its application to the treatment of a hydrocarbon gas from a high pressure gas well. However, it will be understood that the invention is applicable to the treatment of any gas containing heavy and light constituents to separate the gas into two fractions and to recover the residue gas fraction at a pressure not substantially lower than the pressure of the feed gas.

Referring now to the figure, high pressure well gas enters a high pressure absorber 10 as feed through line 11. The feed gas contains hydrocarbons which are termed normally gaseous, such as methane, ethane, propane, and butane, and heavier hydrocarbons which are termed normally liquid, such as butane, pentane, and hexane. Butane has an intermediate boiling point and thus is regarded as either a normally liquid or normally gaseous hydrocarbon. The butane, pentane, and hexane are utilizable as constituents of gasoline, and the propane and the butane are utilizable as liquefied fuels. Ethane finds use as a raw material for various manufacturing operations but, where the residue gas is to be used for pressure maintenance of a subterranean petroleum reservoir, the ethane may be used along with the methane for this purpose. Ordinarily, however, where the residue gas is to be used for pressure maintenance, the ethane and higher hydrocarbons are separated from the methane by the absorption operation. However, the absorption operation may be carried out so that any desired constituents of the feed gas will be obtained as residue gas.

The process of the invention is applicable to the treatment of feed gas at any pressure. However, the invention is of greatest utility in the treatment of high pressure feed gas, i. e., gas having a pressure of about 300 to 700 pounds per square inch and higher, for example, gas having a pressure from 2000 to 6000 pounds per square inch and above. The absorber 10 is preferably operated at a pressure as close as possible to the pressure of the feed gas, commensurate, of course, with the desired feed rate to the absorber, whereby the amount of recompression required to bring the residue gas to the desired pressure for the purposes intended is minimized.

The absorber 10 may be any conventional type of absorber capable of operating at the desired pressure and may be a packed column, bubble tower, etc. The feed gas entering through line 11 passes upwardly through the absorber and is countercurrently contacted with a downwardly flowing stream of absorption oil entering the absorber through line 12. The absorption oil entering the absorber through line 12 is previously essentially saturated at a lower pressure in the manner to be hereinafter described with gas having the same components as the residue gas. At the high pressure at which the absorber 10 is operated, compared to the pressure at which the absorption oil is essentially saturated, the absorption oil is capable of dissolving further residue gas components and thus the downwardly flowing stream of absorption oil will dissolve some of the residue gas components from the feed gas. However, the absorption oil having been previously essentially saturated at lower pressure with residue gas components, the capacity of the absorption oil to dissolve residue gas components from the feed gas will be correspondingly reduced. Thus, where the absorption oil has been essentially saturated with methane, the capacity of the absorption oil to absorb methane from the feed gas will be reduced but the capacity of the absorption oil to absorb the constituents of the gas heavier than methane will not be substantially affected. In the same manner, if the absorption oil has been essentially saturated with methane and ethane, the capacity of the absorption oil to absorb methane and ethane from the feed gas will be reduced but the oil will absorb the constituents of the feed gas heavier than methane and ethane. Depending upon the hydrocarbon components with which the absorption oil is essentially saturated, the amount of these hydrocarbon components absorbed in absorber 10 by the absorption oil will be reduced and the amount leaving the top of the absorber 10 through line 13 as residue gas will be increased. The absorber, being operated at a pressure as close as possible to the pressure of the feed gas at its source, the residue gas leaving through line 13 will be at a high pressure in addition to being, as a result of presaturation of the absorption oil, in greater volume.

The rich absorption oil containing both the gaseous hydrocarbon components with which it had been essentially saturated prior to entry into the absorber and the gaseous hydrocarbons absorbed from the feed gas leaves the absorber through line 14 and is passed to a low pressure reabsorber 15. Reabsorber 15 is operated at a pressure sufficiently low to effect flashing from the rich oil of at least those light hydrocarbons representing the components of the residue gas. The gases flashed from the rich absorption oil travel upwardly through the reabsorber and are countercurrently contacted therein with a downwardly flowing stream of lean absorption oil entering the reabsorber through line 20 connected to line 21. The downwardly flowing stream of absorption oil, by selection of proper operating conditions of temperature, pressure, and gas-oil ratio, will selectively absorb those hydrocarbons heavier than those representing the components of the residue gas.

The rich oil is withdrawn from the reabsorber through line 22 containing pump 23, passes through heat exchanger 24 and heater 25, and enters oil stripping still 30. In still 30, the hydrocarbons absorbed by the absorption oil in absorber 10 and reabsorber 15 are removed from the oil by steam distillation, the steam being provided through line 31, and the hydrocarbons pass from the still along with steam through line 32. Heavy hydrocarbons and the steam are condensed in condenser 33 and the condensate passes to reflux accumulator 34 from which the condensed water is removed through settler 35. The condensed hydrocarbons pass from the accumulator through line 36 and a portion is returned through line 40 containing pump 41 to the top of the still 30 as reflux and the remainder is withdrawn through line 42 containing pump 43 as raw gasoline product. Uncondensed hydrocarbons leave the accumulator through line 44 and are recycled to the reabsorber 15 for recovery of any desired hydrocarbons not condensed in condenser 33.

Lean oil is removed from the bottom of still 30 through line 45 and passes through heat exchanger 24 where, by indirect heat exchange, the incoming rich oil is heated by the hot lean oil.

After leaving the heat exchanger, the lean oil passes through cooler 50 where it is cooled to a suitable, desired temperature. Thereafter, the lean oil is pumped by pump 51 through line 21.

The gases not absorbed by the absorption oil in reabsorber 15 are removed through line 52 and passed to lean oil saturator 53. In lean oil saturator 53, these gases are contacted with lean absorption oil to essentially saturate the lean oil. The lean absorption oil may contact the gases either countercurrently or concurrently within the saturator. If the former mode of operation is employed, the lean oil is brought into the saturator at the top portion thereof through line 54 while the gases are brought into the saturator at the bottom portion thereof through line 52, and the saturated oil is removed from the saturator through line 55. Where the latter mode of operation is employed, the lean oil may be brought into the saturator at the bottom portion thereof by passing the oil through line 60 connected to line 54 and admixing the oil with the gas entering through line 52. The oil and admixed gas pass upwardly through the saturator, the saturated oil leaving the saturator through line 61. Where countercurrent contacting is employed, the saturator may be a packed column, bubble tower, or other type of apparatus suitable for countercurrent contacting of gas and liquid. Where concurrent contacting is employed, the saturator may be a packed column, perforated plate column, or other type of apparatus suitable for concurrent contacting of gas and liquid. It is preferred to operate reabsorber 15 and saturator 53 under conditions of temperature, pressure, and gas-oil ratio such that as large an amount of gas entering the saturator 53 is absorbed by the oil as possible. However, complete absorption of the gas is not always practical and any unabsorbed gas is removed as by-product gas through line 62 to be utilized as desired.

From many plant operations, low pressure gases containing hydrocarbons desirably recovered as components of the raw liquid product or containing hydrocarbons that may be employed for essentially saturating the lean oil in saturator 53 are available. Where these gases are available, and it is desired to recover the raw liquid product components or employ the gases for saturating the lean oil as, for example, where insufficient gas is available in the stream of gas in line 52 for essentially saturating the lean oil, these purposes may be readily achieved. Thus, utilization of the gases is effected by introducing the gases into the system through line 65 connected to line 44 whereby raw liquid product components are absorbed in reabsorber 15 and residue gas components are dissolved in saturator 53.

The saturated oil leaving saturator 53 enters line 63 and is pumped by means of pump 64 through line 12 to the high pressure absorber 10. The oil leaving saturator 53, as stated, is essentially saturated with gaseous hydrocarbons. These gaseous hydrocarbons, being dissolved in the oil, are brought up to the pressure of the oil in pump 64 thereby eliminating the necessity for gas compressors which are more expensive in operation and initial cost than liquid pumps, and the oil, being essentially saturated with residue gas components absorbs in absorber 10 a correspondingly smaller amount of residue gas and the residue gas is removed from the absorber at high pressure. Thus, the effect of compression of the residue gas is obtained without the necessity for the employment of gas compressors.

Various modifications of the above described process will be apparent to those skilled in the art. For example, the absorption operations in absorber 10 and reabsorber 15 may be carried out in a plurality of stages. Further, the proper gas-oil ratio to be employed in the absorber 10, reabsorber 15, and saturator 53 to effect a desired extent of absorption and separation of particular components, as well as the other operating conditions, can be determined in accordance with the well known principles by those skilled in the art.

Having thus described our invention, it will be understood that such description has been given by way of illustration and example and not by way of limitation, reference for the later purpose being had to the appended claims.

We claim:

1. A process for the treatment of a gas mixture to separate therefrom a heavy gas fraction and to recover at substantially the pressure of the gas mixture a light residue gas fraction which comprises contacting said gas mixture as a primary absorption step with an absorption oil essentially saturated with components of said light residue gas fraction, reducing the pressure on said absorption oil after contacting with said gas mixture to separate therefrom a gaseous phase containing residue gas fraction, contacting said gaseous phase with lean absorption oil to remove therefrom heavy gas fraction components separated with said light residue gas fraction, recovering the remainder of said gaseous phase, stripping said absorption oil after contacting with said gaseous phase to remove therefrom heavy gas fraction components and any residue gas fraction components, recycling a portion of said stripped absorption oil to contact said gaseous phase, recycling the remainder of said stripped absorption oil and contacting said absorption oil with the recovered remainder of said gaseous phase to essentially saturate said absorption oil with residue gas fraction components, increasing the pressure on said essentially saturated absorption oil to at least the pressure of said gas mixture, contacting said essentially saturated absorption oil with said gas mixture in said primary absorption step, recovering heavy gas fraction from said stripping step, and recovering light residue gas fraction from said primary absorption step.

2. A process for the treatment of a gas mixture to separate therefrom a heavy gas fraction and to recover at substantially the pressure of the gas mixture a light residue gas fraction which comprises contacting said gas mixture as a primary absorption step with an absorption oil essentially saturated with components of said light residue gas fraction, reducing the pressure on said absorption oil after contacting with said gas mixture to separate therefrom a gaseous phase containing light residue gas fraction, contacting said gaseous phase with lean absorption oil as a second absorption step to remove therefrom heavy gas fraction components separated with said light residue gas fraction, recovering the remainder of said gaseous phase, stripping said absorption oil after contacting with said gaseous phase to remove therefrom heavy gas fraction components and residue gas fraction components, recovering said residue gas fraction components, recycling said residue gas fraction compnents to said second absorption step, recycling a portion of said stripped absorption oil to contact said gaseous phase in said second absorption step, recycling the remainder of said stripped absorption oil and contacting said absorption oil with the recovered remainder of said gaseous phase to essentially saturate said absorption oil with light residue gas fraction components, increasing the pressure on said essentially saturated absorption oil to at least the pressure of said gas mixture, contacting said essentially saturated absorption oil with said gas mixture in said primary absorption step, recovering heavy gas fraction from said stripping step, and recovering light residue gas fraction from said primary absorption step.

3. A process for the treatment of a hydrocarbon gas mixture to separate therefrom a heavy gas fraction and to recover at substantially the pressure of the hydrocarbon gas mixture a residue gas fraction which comprises contacting said hydrocarbon gas mixture as a primary absorption step with an absorption oil containing dissolved therein components of said residue gas fraction, reducing the pressure on said absorption oil after contacting with said hydrocarbon gas mixture to separate therefrom a gaseous phase containing residue gas fraction, contacting said gaseous phase with lean absorption oil as a second absorption step to remove therefrom heavy gas fraction components separated with said light residue gas fraction, recovering the remainder of said gaseous phase, stripping said absorption oil after contacting with said gaseous phase to remove therefrom heavy gas fraction components and residue gas fraction components, recovering said residue gas fraction components, recycling said residue gas fraction components to said second absorption step, recycling a portion of said stripped absorption oil to contact said gaseous phase in said second absorption step, recycling the remainder of said stripped absorption oil and contacting said absorption oil with the recovered remainder of said gaseous phase to dissolve in said absorption oil residue gas fraction components, increasing the pressure on said absorption oil containing dissolved therein said residue gas fraction components to at least the pressure of said gas mixture, contacting said absorption oil containing dissolved therein said residue gas fraction components with said hydrocarbon gas mixture in said primary absorption step, recovering heavy gas fraction from said stripping step, and recovering residue gas fraction from said primary absorption step.

4. A process for the treatment of a hydrocarbon gas mixture to separate therefrom a raw liquid product and to recover residue gas at substantially the pressure of the hydrocarbon gas mixture which comprises countercurrently contacting said hydrocarbon gas mixture as a primary absorption step with an absorption oil containing dissolved therein components of said residue gas, reducing the pressure on said absorption oil after contacting with said hydrocarbon gas mixture to separate therefrom a gaseous phase containing residue gas components, countercurrently contacting said gaseous phase with lean absorption oil as a second absorption step to remove therefrom raw liquid product components separated with residue gas components, recovering the remainder of said gaseous phase, stripping said absorption oil after contacting with said gaseous phase to remove therefrom raw liquid product and residue gas components, recovering said residue gas components, recycling said residue gas components to said second absorption step, recycling a portion of said stripped absorption oil to countercurrently contact said gaseous phase in said second absorption step, recycling the remainder of said stripped absorption oil and contacting said absorption oil with the recovered remainder of said gaseous phase to dissolve in said absorption oil residue gas components, increasing the pressure on said absorption oil containing dissolved therein said residue gas components to at least the pressure of said hydrocarbon gas mixture, countercurrently contacting said absorption oil containing dissolved therein said residue gas components with said hydrocarbon gas mixture in said primary absorption step, recovering raw liquid product from said stripping step, and recovering residue gas from said primary absorption step.

5. A process for the treatment of a hydrocarbon gas mixture to separate therefrom a raw liquid product and to recover residue gas at substantially the pressure of the hydrocarbon gas mixture which comprises countercurrently contacting said hydrocarbon gas mixture as a primary absorption step with an absorption oil containing dissolved therein components of said residue gas, reducing the pressure on said absorption oil after contacting with said hydrocarbon gas mixture to separate therefrom a gaseous phase containing residue gas components, countercurrently contacting said gaseous phase with lean absorption oil as a second absorption step to remove therefrom raw liquid product components separated with residue gas components, recovering the remainder of said gaseous phase, stripping said absorption oil after contacting with said gaseous phase to remove therefrom raw liquid product and residue gas components, recovering said residue gas components, recycling said residue gas components to said second absorption step, recycling a portion of said stripped absorption oil to countercurrently contact said gaseous phase in said second absorption step, recycling the remainder of said stripped absorption oil and countercurrently contacting said absorption oil with the recovered remainder of said gaseous phase to dissolve in said absorption oil residue gas components, increasing the pressure on said absorption oil containing dissolved therein said residue gas components to at least the pressure of said hydrocarbon gas mixture, countercurrently contacting said absorption oil containing dissolved therein said residue gas components with said hydrocarbon gas mixture in said primary absorption step, recovering raw liquid product from said stripping step, and recovering residue gas from said primary absorption step.

6. A process for the treatment of a hydrocarbon gas mixture to separate therefrom a raw liquid product and to recover residue gas at substantially the pressure of the hydrocarbon gas mixture which comprises countercurrently contacting said hydrocarbon gas mixture as a primary absorption step with an absorption oil containing dissolved therein components of said residue gas, reducing the pressure on said absorption oil after contacting with said hydrocarbon gas mixture to separate therefrom a gaseous phase containing residue gas components, countercurrently contacting said gaseous phase with lean absorption oil as a second absorption step to remove therefrom raw liquid product components separated with residue gas components, recovering the remainder of said gaseous phase, stripping said absorption oil after contacting with said gaseous phase to remove therefrom raw liquid product and residue gas components, recovering said residue gas components, recycling said residue gas components to said second absorption step, recycling a portion of said stripped absorption oil to countercurrently contact said gaseous phase in said second absorption step, recycling the remainder of said stripped absorption oil and concurrently contacting said absorption oil with the recovered remainder of said gaseous phase to dissolve in said absorption oil residue gas components, increasing the pressure on said absorption oil containing dissolved therein said residue gas components to at least the pressure of said hydrocarbon gas mixture, countercurrently contacting said absorption oil containing dissolved therein said residue gas components with said hydrocarbon gas mixture in said primary absorption step, recovering raw liquid product from said stripping step, and recovering residue gas from said primary absorption step.

DANIEL T. McDONALD, JR.
THOMAS H. KING.

REFERENCES CITED

The following references are of record in the file of this patent:

UNITED STATES PATENTS

| Number | Name | Date |
|---|---|---|
| 2,249,885 | Carney | July 22, 1941 |
| 2,388,048 | Garrison et al. | Oct. 30, 1945 |